United States Patent [19]

Howery

[11] Patent Number: 4,620,932

[45] Date of Patent: Nov. 4, 1986

[54] SUBMICRONIC HYDROPHILIC FILTER MEDIA

[76] Inventor: Kenneth A. Howery, 34 Mayhew Dr., South Orange, N.J. 07079

[21] Appl. No.: 651,513

[22] Filed: Sep. 17, 1984

Related U.S. Application Data

[63] Continuation-in-part of Ser. No. 501,095, Jun. 6, 1983, abandoned.

[51] Int. Cl.$^4$ .............................................. B01D 39/16
[52] U.S. Cl. .................. 210/808; 210/500.1; 210/490; 210/505; 210/508; 210/500.35
[58] Field of Search ............ 210/490, 505, 508, 500.1, 210/500.2, 507, 506, 504, 767, 808

[56] References Cited

U.S. PATENT DOCUMENTS

| | | | |
|---|---|---|---|
| 2,944,017 | 7/1960 | Cotton | 210/500.2 |
| 4,076,619 | 2/1978 | Howery | 210/169 |
| 4,242,159 | 12/1980 | Klimmek et al. | 210/490 |
| 4,366,068 | 12/1982 | Ostreicher et al. | 210/500.2 |
| 4,431,545 | 2/1984 | Pall et al. | 210/500.2 |
| 4,523,995 | 6/1985 | Pall et al. | 210/504 |

*Primary Examiner*—Benoit Castel
*Attorney, Agent, or Firm*—Hoffmann, Dilworth, Barrese & Baron

[57] ABSTRACT

The present invention is a one-piece construction submicronic filter media capable of high volume filtration of sub-micronic sized particulate from fluids without the addition of wetting agents, solvents, added electrical charge enhancers, or elevated pressure differentials, which includes a continuous matrix having an initial micron rating of from about 1 to about 5 microns. The continuous matrix is impregnated with a hydrophilic terpolymer by step-wise addition of low viscosity terpolymerization mixture including 10% to 14% by weight of a polymer which includes at least one of alkyl acrylate and alkyl methacrylate and acrylic acid. The terpolymeric mixture also includes 17 to about 20% by weight of polyethyleneimine and urea solution, from about 7 to about 10% ammonia and from about 2 to about 6% by weight epoxy resin. The polymerization mixture has a solids content of from about 16 to about 20% by weight prior to polymerization. The step-wise addition by which the matrix is impregnated includes saturating the matrix material with the terpolymeric mixture followed by compressing the saturated material and repeating the saturation compressing at least one additional time followed by drying the saturated matrix.

14 Claims, No Drawings

SUBMICRONIC HYDROPHILIC FILTER MEDIA

RELATED U.S. APPLICATION DATA

The present application is a continuation-in-part of abandoned U.S. patent application Ser. No. 501,095 filed June 6, 1983. Inventor's earlier disclosure, patent application Ser. No. 883,840 filed Mar. 6, 1978 was abandoned July 12, 1982 due to unique advancements in the State-of-the-Art by the inventor.

The continuation-in-part of application Ser. No. 501,095 and the abandoned patent application Ser. No. 833,840 are directly related and dependent upon the teachings of inventor, Howery, in his U.S. Pat. No. 4,076,619 granted Feb. 28, 1978 as originally filed on Oct. 30, 1975 and Titled: *Hydrophilic Acrylic Polymers as Marine Filters, Algae Growth Catalysts, and Breeding Stimulus for Fish and Invertebrates.*

BACKGROUND OF THE INVENTION

In U.S. Pat. No. 4,076,619 filed Oct. 30, 1975 and granted Feb. 28, 1978, inventor Howery, taught of Hydrophilic Polymeric Formulations when applied to various matrix materials would act as filters by means of Molecular Absorption Chemical Filtration in both Marine and Freshwater. Inventor further taught of application of Hydrophilic Polymeric Materials as a film-forming coating and in pellet form of filtration media. Further developments by inventor with polymeric formulations and matrix materials and variations thereof disclosed in U.S. Pat. No. 4,076,619 advanced the state-of-the-art resulting in a filing of U.S. patent application Ser. No. 883,843 on Mar. 6, 1978 titled: *Aqueous Hydrophilic Polymers and Variations Thereof As Selective Filters of Liquids, Gases and Other Materials.*

Further developments by inventor, Howery, antiquated the teachings in U.S. patent application Ser. No. 883,843 that led to its abandonment. The instant application is a continuation-in-part of patent application Ser. No. 501,095 and uses the earlier teachings of the inventor to disclose a unique terpolymeric Submicronic Hydrophilic Filtration Media unlike the inventions of (1) Pall, U.S. Pat. No. 4,431,545, (2) Ostreicher, U.S. Pat. No. 4,366,068, (3) Klimmek, U.S. Pat. No. 4,242,159 as well as others.

SUMMARY OF THE INVENTION

This invention consists of a novel filter media and in a unique method of making it.

The present application is a continuation-in-part of abandoned U.S. patent application Ser. No. 501,095 and includes by reference *Hydrophilic Polymeric Liquids* of the chemical and physical characteristics disclosed by inventor in U.S. Pat. No. 4,076,619 as sprayed, dipped, impregnated, or applied by other methods so as to saturate the structure of a variety of matrix materials to form a *single, one piece construction,* Submicronic Hydrophilic Filter Media.

The invention removes submicronic size particulate from liquids and gases by *chemical filtration,* as opposed to mechanical and other forms of filtration, at absolute particle micron ratings as low as 0.10 in a single pass through the invention at liquid and gas pressures ranging as low as 0-5 lbs/in$^2$ and at heretofore unheard of flow rates of 20-150 gal/min. without the need of assistance from: (a) solvents or wetting agents, (b) initial pressure producing means, (c) opposite charged or any electrically charged media or particles, (d) composite membrane construction, (e) cationically dispersed aqueous slurries, (f) series of filter media having positive and/or negative Zeta Potential, (g) reinforcement by microporous film or membrane, and (h) a variety of other chemical, physical, and electrically charged means.

The invention, of one piece rather than composite construction, has an effective filtration surface depth area 13½ times that of Nitrocellulose and 2030 times that of a Polycarbonate membrane. Uniquely, the invention is dramatically stronger and more chemically resistant when operating at absolute as opposed to the conventional nominal submicronic rated materials.

The invention continuously filters liquids and gases as well as viscous slurries for long periods of time at absolute submicronic levels of purity for long periods of time; 3 to 6 weeks, at high liquid flow rates; i.e. 20-150 gallons/min. at unheard of systems pressures up to 125 psi. as opposed to state-of-the-art submicronic membrane filters and variations thereof.

DETAILED DESCRIPTION OF THE INVENTION

The invention can be fabricated into many forms for suitable submicronic level filtration by either gravity feed or for use in a pressurized system. Its has no limits for physical adaptation in filter cannisters, boxes, trays, rolls, bags, cones and a myriad of forms for liquid and gaseous submicronic filter applications.

Earlier state-of-the-art submicronic filters, including present day media have many physical, chemical, electrical, and mechanical limitations not found in the instant invention that make those products uneconomical for most industrial and scientific applications and practically non-usable for even many of the simplest applications for the instant invention.

*The invention* exhibits none of the negative features common to membranes and other forms of submicronic filtration media. As a one piece terpolymeric submicronic construction when used in most acids, solvents and most other harsh and destructive chemicals and gases, unlike membranes and the like, *will not:* (1) tear, (2) dissolve, (3) show temperature instability, (4) permit media migration, (5) require pressure rather than gravity to permit expected flow properties with liquids and gases, (6) give poor chemical resistance, (7) rapidly load with particulate and clog the filter media.

Further, the invention guarantees decontamination of 100 percent; i.e., cold sterilization of fluids even for the most stringent and unusual applications as compared against membranes by unbiased scientific evaluation. Liquid purity using the invention is controllable from 0.9 down to 0.10 absolute micron rating depending on terpolymeric formulation, process method, and matrix materials as saturated and used.

In addition, the invention thickness, as a one piece construction when made by the process of the invention, is uniquely independent and non-comparable to such state-of-the-art techniques as: (1) supportive membranes, (2) evaporating solvents, (3) specific polymeric concentration, (4) layered construction, (5) pore clogging preventives, (6) composite membrane construction, (7) carriers and carrier films, (8) charge modified sheets, (9) cationic colloidal silica, (10) acids with polyvalent metal cations, (11) polyvinyl alcohol and the like, (12) wetting agents, (13) refractory compositions, (14) Anionic particulates, (15) media having opposite Zeta Potential, (16) microporous reinforced plastic film, and (17) hydrophilic polyamide having positive and negative Zeta Potential operating separately or as composite membrane.

OBJECT OF THE INVENTION

It is an object of the invention to provide a novel one piece construction submicronic hydrophilic filter media of absolute rather than nominal micron ratings exhibiting novel fluid and gaseous flow properties, unique and unmatched physical strength and chemical deterioration resistance combined with non-clogging properties, no filtrate PH change, color change indicators, long life, and economic practicality for use in a myriad of micro-electronic, medical, pharmaceutical, polution control as well as a broad range of other industrial and military and consumer applications.

The form the invention can take may be as fused and sewn bags, pleated sheets and tubes, cones, rolls, sheets, discs, and an endless number of other configurations without any dimunition of chemical and physical properties.

The function of the invention is the efficient and economical removal of suspended particulate material from fluids and gases having absolute submicronic particle size and rating as consistently required for a cold sterilized filtrate.

ADDITIONAL FEATURES OF THE INVENTION

1. Easily processed as a thin, 5 mils, or one inch thick, one piece construction with uniform submicronic hydrophilic filtration properties throughout the invention.
2. Instant cold sterilization of non-potable water by gravimetric means.
3. Increased clarity and purity of optical, medical, pharmaceutical, and cosmetic solutions and products as well as acids, plating solutions, X-Ray materials, industrial solvents and effluent and other commercially manufactured and processed and discharged fluids and gases under EPA and other government regulatory controls.
4. Prevents bacterial grow-through.
5. Non-dissolvable in most strong acids.
6. Changes color to indicate degree of particulate loading and time for replacement.
7. Exhibits unique applications for space and undersea exploration activities.
8. Highest degree of stability; i.e., micron, temperature, pressure, flash point, and molecular integrity of any submicronic media.
9. Ten to thirty times the working life of membranes and other such submicronic filter media.
10. Reclaims expensive metals and chemicals in short supply.
11. Removes carcinogens from fluids and smoke and other burning materials.

Filtration limits on thickness and porosity are not imposable on the invention as a one piece hydrophilic terpolymeric submicronic media because of the continuous learning curve using the media with liquids and gases here-to-fore considered non-filterable by state-of-the-art membranes and othe forms of submicronic filtration materials, media, and composite systems.

DESCRIPTION OF THE PREFERRED EMBODIMENTS OF THE INVENTION

The hydrophilic terpolymeric materials of the invention are derived from the hydrophilic polymeric materials of inventor's U.S. Pat. No. 4,076,619 preferably must saturate the fibrous matrix material of either natural or synthetic material construction such that the wet process weight of the invention is 4 to 6 times the dry weight of any configuration and matrix material selected.

Saturation by the terpolymeric formulation in the various matrix materials may be achieved using a wide variety of natural and synthetic matrix materials and the polymeric formulations and variations thereof as described herein.

The method or process of invention saturation may be by means of (1) depth coating, (2) dipping, (3) spraying, as well as other equally simple and common and economical means.

The preferred wet to dry ratio of the invention may be obtained continuously and uniformly by means of adjustable pinch rolls, doctor blades, flat plate pressing and a number of other commonly used textile and chemical industry state-of-the-art processing means.

Preferably, the matrix material shall be polyester or felt or a combination thereof having a initial micron rating range of 1 to 5 for optimum saturation as well as maximum physical and chemical properties of the processed filtration media, i.e., the invention.

Configuration of the invention for maximum efficiency and uniqueness preferably should be in the form of a bag, cone, tube, pleated sheet, discs, and the like. However, the invention functions as intended as a submicronic hydrophilic filtration media even in sheet or roll or other configurations because depth of filtration media and surface area are both linked to the efficiency parameters of the invention.

The preferred terpolymeric formulation for use with various matrix materials is as follows:

| Item No. | Chemical Ingredients | Percent By Weight |
| --- | --- | --- |
| 1. | Water | 60–64 |
| 2. | Polymer containing Ethyl and Methyl Methacrylate and Acrylic Acid | 10–14 |
| 3. | Polyethyleneimine and Urea Solution | 17–22 |
| 4. | Ammonia | 7–10 |
| 5. | Epoxy Resin | 2–6 |

Preferably, the solids content of the above detailed liquid Terpolymeric formulation shall be 16–20 percent prior to cross-linked Polymerization. Upon curing for 3 days at 100–150 degrees Fahrenheit the molecular weight shall range between 1 to 1.8 million.

Preferably, the invention process sequence of operations shall conform to the following:

A- Mixing Procedure

1. Mixing of the terpolymeric formulation shall be conducted at temperatures ranging from 65–100 degrees Fahrenheit for a period of 30 minutes to 1 hour at 20–50 RPM.
2. PH of the mixed terpolymeric solution may rage from 10 to 11.
3. Viscosity of the solution prior to application to a matrix may range from 22 seconds using a #2 Zahn Cup to 60 seconds with a #4 Zahn cup.
4. The rate of absorption of the terpolymeric formulation into the preferred matrix material for saturation of the filter media may be one gallon of terpolymer or modifications therof per 500–600 cubic inches of matrix.

5. Mixing of the formulation should preferably by with a paddle-type mixer at speeds ranging from 20-80 rpm so as to reduce foaming action. Compatible defoaming agents may be added as needed.

Variations in viscosity, temperature, PH, and saturation rate by more then + or −10 perent can render the invention non-functional.

B- Saturation Process

1. The mixed terpolymeric formulation conforming to the parameters previously disclosed shall be applied to the preferred matrix material by depth coating, spraying, dipping in non-magnetic stainless steel equipment at the previously prescribed viscosity, temperature range, and absorption rate. Non compatible matrix materials will alter the properties of the invention.

2. Pass the terpolymeric saturated matrix material through a series of inert material coated pinch rolls of 2-6 inch diameter temperature controlled at 85-100 degrees Fahrenheit so as to give the invention a wet or saturated weight of no less than 4 to 6 times the dry weight per cubic inch of the preferred matrix material.

3. The pressure exhibited on the invention by the pinch rolls shall be no more than the torque developed on a 3 inch dia.roll from a 1 hp. motor operating between 6-10 rpm.

4. First stage drying of the invention shall preferably be conducted in sterile room environment to prevent bacterial and particulate contamination of the terpolymeric material during the drying operation. Ovens of the batch or continuous type design are preferred for drying or moisture evaporation. Oven temperatures are preferred between 160-250 degrees Fahrenheit for a drying period ranging from 15-20 minutes for each five (5) gallons of terpolymer absorbed into the matrix material. Air flow changes under a positive pressure are required to evaporate moisture from the invention. The preferred rate of air change is 6 to 10 times per hour by volumetric room capacity. Moisture removal from the invention shall be 40-60 percent in a period ranging from 25-40 minutes at the recommended oven temperatures.

5. Second stage drying is necessary to achieve a 2 percent moisture condtion of the invention. Preferred drying time and temperatures are 24-36 hours under negative pressure at 100-160 degrees Fahrenheit. Preferred air changes during this drying stage are 5-7 times per hour depending on drying room size, configuration and exhaust system.

6. Third stage or wet processing is most critical to the desired parameters of the invention. Add 20-25 lbs of a research grade marine salt containing trace elements to each 50 gallons of sterile water circulating at the rate of 10-20 gal/min at temperatures ranging from 150-190 degrees Fahrenheit. Circulate the warm water solution for 40-60 minutes and then add 60-80 units of the invention each having a weight range from 4-6 oz dry. A series of freshwater and marine water washes are preferred over a 3 to 4 day process cycle to render the invention suitable for submicronic level filtration.

7. After completion of the 3-4 day third stage wet wash process, remove invention from the system using preferred sterile accessory equipment. Pass the wet condition of the invention through a series of temperature and pressure controlled rolls in a sterile environment to densify the media and to create the desired texture and finish. This stage also serves to loosen and remove any foreign matter left from the other process stages so as to insure no future media migration from the invention when used in accordance with recommended procedures.

8. The preferred final drying stage is conducted in a sterile environment with slow drying of the invention at 65–90 degrees Fahrenheit for a time period ranging from 12–15 hours with a continuous positive pressure control of the room or drying vessel. Air Conditioned environments are not feasible due to the potential for bacterial growth within the invention during this final process stage.

INVENTION QUALITY CONTROL

Quality Control of the invention for use in the submicronic filtration of liquids and gases is comprised of a two (2) stage procedure.

Intent of the Quality Control Procedures

The first control stage is a test for inorganic and organic impurities in the terpolymeric formulation that could have the potential of contaminating liquids and gases filtered by the invention.

The second control stage is a test of the submicronic integrity of the invention.

Stage One: (Primary Extractable Impurity)

1. Invention is placed in a Monel vessel containing molecular sieve sterile freshwater. Add research grade synthetic sea salt to make a four percent solution. Heat the solution to 180 degrees Fahrenheit and maintain for twelve hours. Extract a sample of the solution for spectrophotometer as well as mass spectrophotometer/gas chromatography analysis.

2. Invention is next flushed with 100 gallons of deionized water. The test vessels containing invention are then refilled with freshwater that has been rendered sterile to a water purity of three (3) megohm purity. The water is reheated to 180 degrees Fahrenheit for twelve hours. Samples are then extracted for spectrophtometer and gas chomatography analysis.

Stage Two: (Submicronic Integrity)

A solution is prepared containing various sized particles of the micron rating of the invention media. The test solution can vary from 16 megohm purity freshwater up to seawater as well as acid and basic solutions ranging in PH from 10 to 14. Solvents are also used as test solutions depending on the nature of the application for the invention. Examples of the type particles to be used are Latex Beads, Carbon Fines, Algae, Bacteria, and the like. The prepared solution is filtered by the invention and collected in a sterile, particulate free container. It is then refiltered with a sterile research grade FDA approved capillary pore poly-carbonate membrane of 25 MM. diameter having the same submicronic particle rating as the invention; i.e., 0.1 to 0.95 Absolute micron. The polycarbonate membrane is then subjected to microscopic examination at 2000 magnification to observe the membrane pore openings. Various types of particles require different type stains or dyes to properly observe the magnified particles. Research membranes used as comparative test vehicles must be free of particles in the compared pore size range. Smaller particles may collect from electrostatic and other such phenomena. These smaller particles are removed by particle sizing and further submicronic test filtration.

Sterility Testing of 0.1 Micron Filter; i.e. Invention Bacterial cultures are prepared containing *Pseudomonas Diminutia*. The cultures are added to an appropriate aqueous solution filtered by the invention and collected in a sterile vessel and then transferred to the proper growth media per USP Regulations and subsequently incubated for a period of twelve hours. The culture media is observed periodically for bacterial growth. When required, the filtered solution is again filtered with a 0.1 micron rated research grade sterile membrane and then added to the culture media for the incubation period. After completion of the incubation period, the media can be removed, gram stained, and examined at 2000 magnification in microscopic equipment.

EXAMPLES

The properties of the invention, i.e., Submicronic Hydrophilic Filtration Media, are illustrated by, but not limited to, the following examples: EXAMPLE #1

(Cold Sterilization of Water)

A world leader in the distribution of scientific apparatus, headquartered in the Chicago Area, selected a sight on Lake Michigan with known water polution problems. Water from the lake previously tested as highly poluted was pumped through a filter canister containing the invention in submicronic bag form. The flow rate was 20 gpm and the micron rating of the invention was 0.2. The water was pumped for 3 weeks continuously and was tested as being cold sterilized without the use of aids for a period of three weeks of continuous passage through the invention before needing replacement.

EXAMPLE #2

(Bacteria Removal From Tranquility Tubs)

In the City of Baltimore a tranquility tub system manufacturer pumped a solution comprised of 93 degree water and Epsom Salt as a circulating medium through a filter canister containing the invention in single bag form. After pumping the solution through the invention at the rate of 20 gal/min and 5 psi pressure for a period of three weeks, analysis of the water solution showed no evidence of bacteria in the water after usage by more then 60 occupants, each immersed for 2-3 hours.

EXAMPLE #3

(Metals Reclamation)

Using the invention in submicronic bag form under pressure and also in conical form with gravity as the flow producing means, a New York City precious metals refiner pumped a silver and platinum water solution effluent, as well as other rare metals, at the rate of 50 gal/min through the invention in a single bag form. After four weeks of continuous filtration, using the invention exclusively, no rare metal fines larger then 0.2 micron passed through the bag as industrial effluent. The reclamation of rare metals was previously tried by this and other refiners in the area without success using conventional membranes at a cost prohibitive to the reclamation of metal. Valuable metals usually lost in effluent from the industrial processes were recovered by the invention and subsequently remelted after recovery of the metal fines from the invention by either a quick acid dip or by incineration.

EXAMPLE #4

(Pharmaceutical Products)

At a major pharmaceutical company located in New Jersey, the leading manufacturer of vitamins and other pharmaceutical products was having no success in filtering, to submicronic purity levels, the mother liquor used to make vitamins and vitamin related products. Repeated tests using submicronic rated membranes resulted in the dissolving of the membranes and other forms of submicronic media in a matter of minutes. The solution being filtered was a mother liquor containing Toluene, water and tar interfaces.

The invention in a single composition bag form was placed in a 50 gal/min. Stainless Steel filter vessel through which 5000 gallons of the Toluene containing Vitamin complex was pumped. The 5000 gallon batch of vitamin complex was filtered through the invention at the rate of 50 gal/min at 10-15 psi system pressure. The invention separated the highly toxic and corrosive complex into a perfectly clear and non-toxic liquid as required for the product without clogging or showing any signs of deterioration of the invention over a four week period involving several hundred thousand gallons of the filtrate. The invention permitted the separation of the three elements of the solution at an extremely economical return on investment and to the purity requirements heretofore unattainable with any form of filtration; i.e., submicronic or otherwise.

EXAMPLE #5

(Removal of Silica From Acid)

A manufacturer at a glass etching manufacturing facility in Pennsylvania, was unable to filter Silica from Hydrofluoric Acid on an economical basis and at a flow rate practical for the manufacture when using conventional submicronic membranes and other forms of submicronic media due to the lack of physical and chemical strength and low flow rates available through membranes and other forms of submicronic filter media. Upon the installation of a 50 gal/min filter vessel containing both bag and disc forms of the invention, the manufacturer was able to filter the solution and remove the Silica Fines to a purity of the Hydrofluoric Acid of 0.2 micron absolute rating without any deterioration of the invention in six weeks of continuous operation. The invention was used at 15 psi in contrast to submicronic rated membranes that required 100 psi and disintegrated in less then ten minutes of continuous operation.

EXAMPLE #6

(Removal of Pigment From Mineral Spirits and Solvents)

At the headquarters of a leading paint and related products manufacturer located in Pittsburg, Pa., scientists attempted to separate and remove paint pigment from mineral spirits and solvents used in the manufacture of house paints. Using submicronic membranes and other available submicronic rated filter medias; Instant clogging and chemical deterioration of those submicronic media by the solvents prevented the recovery of pigment, mineral spirits, and solvents for reuse in a proposed new cost reducing manufacturing process. Installation of the invention in single piece cone construction proved the feasibility of the invention in the research laboratory. Subsequent installation of the invention in bag type form in a 50 gal/min filtration vessel and system resulted in the total removal of 0.2 micron paint pigment and complete recovery of the mineral spirits and solvents without clogging or deterioration of the submicronic media at negligible pressure increase in the system over weeks of continuous operation. Further, no media migration from the invention was found in the filtrate at any time during the experiment.

EXAMPLE #7

(Extraction of Carbon Fines In Solution)

In an industrial firm located in Upper New York State, a manufacturer was seeking a means to remove Carbon Fines from a highly corrosive chemical solution. Repeated attempts to filter the Carbon Fines from the corrosive liquid with submicronic rated membranes failed due to factors inherent with the manufacturing process; namely, pressure and the very strong chemical attack. The invention was installed in one piece bag construction in a conventional 100 gal/min stainless steel filter vessel. Carbon Fines of 0.1 Micron absolute rating were completely removed by the invention from the solution for a period of two months without any change in end product filtrate and without media clogging or deterioration.

EXAMPLE #8

(Removal of Asbestos From Municipal Water Supply)

At a large Southern N.J. City transporting potable water through Asbestos Pipe, the EPA found toxic levels of Asbestos Fines in a major segment of populations private and commercial drinking water supply. Attempts to remove the Asbestos with membranes and other submicronic filtration media having 0.1 to 0.5 micron particle size were unsucessful due to the volume of water and pressure in the systems that were filtered. Rapid clogging and tearing of the membranes and other trial media occurred in a matter of minutes making the use of conventional membranes and the like economically and practically unacceptable to both the EPA and the community. Installation of the invention in submicronic fused bag form, as the filtration media in a 100 gal/min system resulted in the complete and continuous filtration of the Asbestos from the water system over a period of many weeks without clogging, restriction of flow, or pressure increase.

EXAMPLE #9

(Bacteria and Parasite Removal From Fresh and Marine Water)

At numerous domestic and foreign locations, 20 to 150 gal/min systems containing the invention in submicronic bag and other forms were used, without ultraviolet lights and other known state-of-the-art aids, to cold sterilize both fresh and marine water to 0.1 to 0.5 absolute micron purity on a continuous basis. The poor flow ratings, pressure fragility, and constant clogging of conventional submicronic membranes made their application economically unfeasible at all locations.

During the filtration procedure using the invention in bag, disc, and other forms, the invention removed all traces of parasites, fungus spores, bacteria, and free floating algae from water containing a wide variety of both tropical and edible fish and invertebrates. In no situation where the invention was used at 20 to 150 gal/min to filter parasites, bacteria, and fungus and algae did the system pressure exceed 15 psi; nor was particulate, larger then 0.2 Micron absolute found in the system, nor was fluid flow reduced or was deterioration of the invention seen after passage of millions of gallons of fresh and marine water.

EXAMPLE #10

(Radioactive Particulate)

At a New Jersey Atomic Power Plant and at a nearby municipal water supply, the invention in one piece bag construction was used to filter both waste water from the Atomic Plant and for potable water from the municipal supply. Prior to installation the EPA had tested both facilities and found unacceptable levels of radioactive particulate in the water at both locations—indicating seepage from the power plant into the municipal water supply. Continuous pumping of the radioactive fluids at 50 gpm through the invention showed no trace of radioactive particulate in the filtrate over weeks of filtration of the contaminated fluids. All water analysis was conducted by Federal and State Scientists assigned to the investigation. Previous tests using submicronic membranes and other such filtration media failed to remove the radioactive particulate to the safe levels as required by the EPA and the Atomic Energy Commission. The invention was subsequently removed to a protected environmental laboratory and examined for radioactive particulate content and any signs of physical deterioration.

EXAMPLE #11

(Degreasing Solvents)

In a Trenton, N.J. Degreasing Equipment Company, the invention was substituted for submicronic membranes in order to filter the degreasing solvents recirculated in the degreasing machine. Conventional 0.2 micron submicronic membranes and the like dissolved in the solvents in a matter of minutes. The invention, in 0.2 micron bag construction, was used continuously to filter particulate to 0.2 micron purity at the rate of 1200 gallons/hr. for a period of four weeks before the invention needed replacement. No deterioration or media migration of the invention was observed at any time nor did the filtrate purity vary more then 2 percent during the test period. Some of the fluids filtered with the invention were: 90% Methanol, Freon TF, Genosil D and Freon TOFC.

EXAMPLE #2

(Industrial Gas Effluent)

At the manufacturing facility in Connecticut of a leading industrial exhaust system filter producer, the invention was substituted in place of their conventional units as supplied to them by Universal Filter Co. The invention was utilized in bag form. Prior to the evaluation of the invention the EPA had cited several manufacturers in the area, using the conventional exhaust gas filters, for non-compliance with State and Federal Clean Air Regulations. Upon installation of the invention into the test system, the exhaust gas purity met the regulatory requirements and maintained the level of purity for weeks.

EXAMPLE #13

(Surgery Performed By Laser Means)

At the Cornell University Medical Research Hospital located in New York City, the cooling water for the optical laser surgical equipment continuously malfunctioned using submicronic membranes to filter the systems water. The cause of the problem was determined as the membranes inability to continuously remove submicronic particulate in the cooling water. Upon installation of the invention in bag and other forms the particulate level of the cooling water was maintained continuously for months at 0.1 micron purity.

Another problem also had developed using conventional membranes for submicronic filtration of immersion baths used for post operative surgery. Patients placed in saline solution baths after laser surgery were constantly developing serious and often fatal infections. Due to the success of the invention with laser equipment cooling water the medical scientists decided to substitute the invention in place of membranes to maintain a sterile immersion environment for the post-operative patients. As with the membranes, the invention was replaced once each week in the water circulating system. After several months of continuous use of the invention on post-operative patients, it was found no patient had developed any type of infection and the saline solution was maintained continuously at the desired medical purity levels.

EXAMPLE #14

(Sterilization of Dialysis Fluid)

At a leading Blood Dialysis research facility in the Eastern U.S., the invention in bag and other forms was used as a submicronic prefilter for Dialysate Solution prior to passing the fluid through an FDA approved membrane system in order to increase the life of the FDA approved membranes. The dialysate was maintained in a sterile condition through the invention and increased the life of the FDA approved membranes from minutes to weeks offering the dialysis facility doctors improvements in the economics of the filtration system by using the invention in submicronic (0.2 micron) form as a prefilter for approved medical filtration membranes.

EXAMPLE #15

(Carcinogen Removal from Cigarette Smoke)

At the Ligett & Myers research facility in North Carolina, scientists were seeking a means to filter carcinogens from cigarette smoke by developing a filter to be incorporated in the cigarette that would also not change or eliminate the taste of the existing products; i.e., name brand cigarettes. Previous attempts using submicronic membranes effected taste and resulted in the melting of the membranes in a matter of seconds. In addition, the cost of membranes in a cigarette as a filter proved economically unfeasible. Substitution of the invention in thick disc form proved conclusively, total removal of carcinogens for the life of each cigarette. The market field testing of cigarette samples showed no taste deterioration or other negative reaction from the smokers sampled. The economics of the use of the invention as a cigarette filter are under evaluation by several manufacturers.

EXAMPLE #16

(Wine and Spirits Filtration)

At several wine producing facilities and at a number of domestic and foreign distillerys, the invention was used in place of membranes for economic and longevity purposes in the submicronic filtration of bacteria, spores, and other contaminants from wine and alcohol products. The invention outperformed the membranes economically and functionally due to the high flow rate requirements and the need for longer life of the filtration media.

Having disclosed my invention and described in detail its preferred embodiments, I claim and desire to secure by Letters of Patent:

1. An essentially one-piece construction submicronic filter medium capable of high volume filtration of submicronic size particulate from fluids in the substantial absence of (1) added wetting agents and solvents, (2) added electrical charge enhancers, and (3) elevated pressure differentials comprising:

a continuous matrix material having an initial micron rating of from about 1 to about 5 microns;

a hydrophilic terpolymer impregnated on said matrix material by step-wise addition of a low-viscosity terpolymeric polymerization mixture comprising from 10% to about 14% by weight of a polymer which includes at least one of alkylacrylate and alkylmethacrylate and acrylic acid; from about 17% to about 22% by weight polyethyleneimine and urea solution; from about 7% to about 10% by weight ammonia; and from about 2% to about 6% by weight epoxy resin, said polymerization mixture having a solids content of from about 15% to about 20% by weight prior to polymerization, said step-wise addition comprising saturation of said matrix material with said terpolymeric mixture followed by compressing said saturated matrix material, and repeating said saturation and compressing at least one additonal time until the saturated weight of the said matrix is from about 4 to about 6 times the dry weight per cubic inch of matrix, and drying said saturated matrix material in a first stage drying in which the moisture removal from the saturated matrix is from about 40 to about 60% followed by a second stage drying wherein the moisture in the saturated matrix is reduced to about 2%, whereby said one-piece construction submicronic filter medium is formed.

2. The filter medium of claim 1 wherein said continuous matrix material is selected from the group consisting of polyester, felts, polypropylene, viscous rayon, polyolefins, and mixtures thereof having said initial micron rating.

3. The filter medium of claim 1 wherein said saturation is effected by one of depth coating, dipping, and spraying said matrix material followed by said compressing.

4. The filter medium of claim 1 wherein said drying further comprises a sterile, wet treatment wherein said matrix material is washed with fresh water and salt water over a 3 to 4 day period; followed by controlled compression treatment in a sterile environment; and final drying under mildly elevated temperature and essentially atmospheric pressure.

5. The filter medium of claim 4 wherein said first drying is conducted at a temperature of from about 160° to about 250° F. for a time period of from about 15 minutes to about 20 minutes for each 5 gallons of terpolymeric composition absorbed by said matrix at a constant air exchange rate.

6. The filter medium of claim 4 wherein said second drying is conducted under subatmospheric pressure condition over a time period of from about 24 to about 36 hours at a temperature of from about 100° to about 160° F.

7. The filter medium of claim 4 wherein said salt water wash is prepared by addition of from about 20 to about 25 pounds of research grade marine salt to about 50 gallons of sterile water which is circulated at a rate of from about 10 to about 20 gallons per minute at a temperature ranging from 150° to about 190° F.

8. The filter medium of claim 4 wherein said matrix is formed during said final drying stage into the desired shape.

9. The filter medium of claim 8 wherein said shape comprises a bag for fitting into a canister filtration device.

10. The filter medium of claim 1 wherein said terpolymeric polymerization mixture is prepared in an aqueous solution by mixing at a temperature range of from about 65 to about 100° F. for a period of from about 30 minutes to about 60 minutes at a rate of from about 20 to about 50 rpm.

11. The filter medium of claim 10 wherein the final pH of said mixed terpolymeric solution ranges from about 10 to about 11.

12. The filter medium of claim 1 wherein the viscosity of said solution prior to application to said matrix ranges from about 22 seconds using a No. 2 Zahn Cup to about 60 seconds using a No. 4 Zahn Cup.

13. A process for high volume filtration of fluids to remove submicronic size particulate therefrom, in the substantial absence of (1) added wetting agents and solvents, (2) added electrical charge enhancers, and (3) elevated pressure differentials, comprising passing said fluid at a rate of from about 10 to about 150 gallons per minute under a pressure of gravity to not more than about 30 pounds per square inch through at least one essentially one-piece construction submicronic filter medium which comprises a continuous matrix material having an initial micron rating of from about 1 to about 5 microns which is impregnated with a hydrophilic terpolymer by step-wise addition of a low viscosity terpolymeric polymerization mixture comprising from about 10% to about 14% by weight of a polymer, which includes at least one of alkylacrylate and alkylmethacrylate, and acrylic acid; from about 17% to about 22% by weight polyethyleneimine and urea solution; from about 7% to about 10% by weight ammonia; and from about 2% to about 6% by weight epoxy resin, said polymerization mixture having a solids content of from about 16% to about 20% by weight prior to polymerization, said step-wise addition comprising saturation of said matrix material with said terpolymeric mixture followed by compressing said saturated matrix material, and repeating said saturation and compressing at least one additional time, and drying said saturated matrix material, whereby said one-piece construction submicronic filter medium is formed.

14. The method of claim 13 wherein particulate matter with particle sizes ranging from about 0.1 to about 0.9 absolute micron rating is filtered from said fluid under the pressure of from gravity to about 5 pounds per square inch.

* * * * *